Patented Feb. 10, 1925.

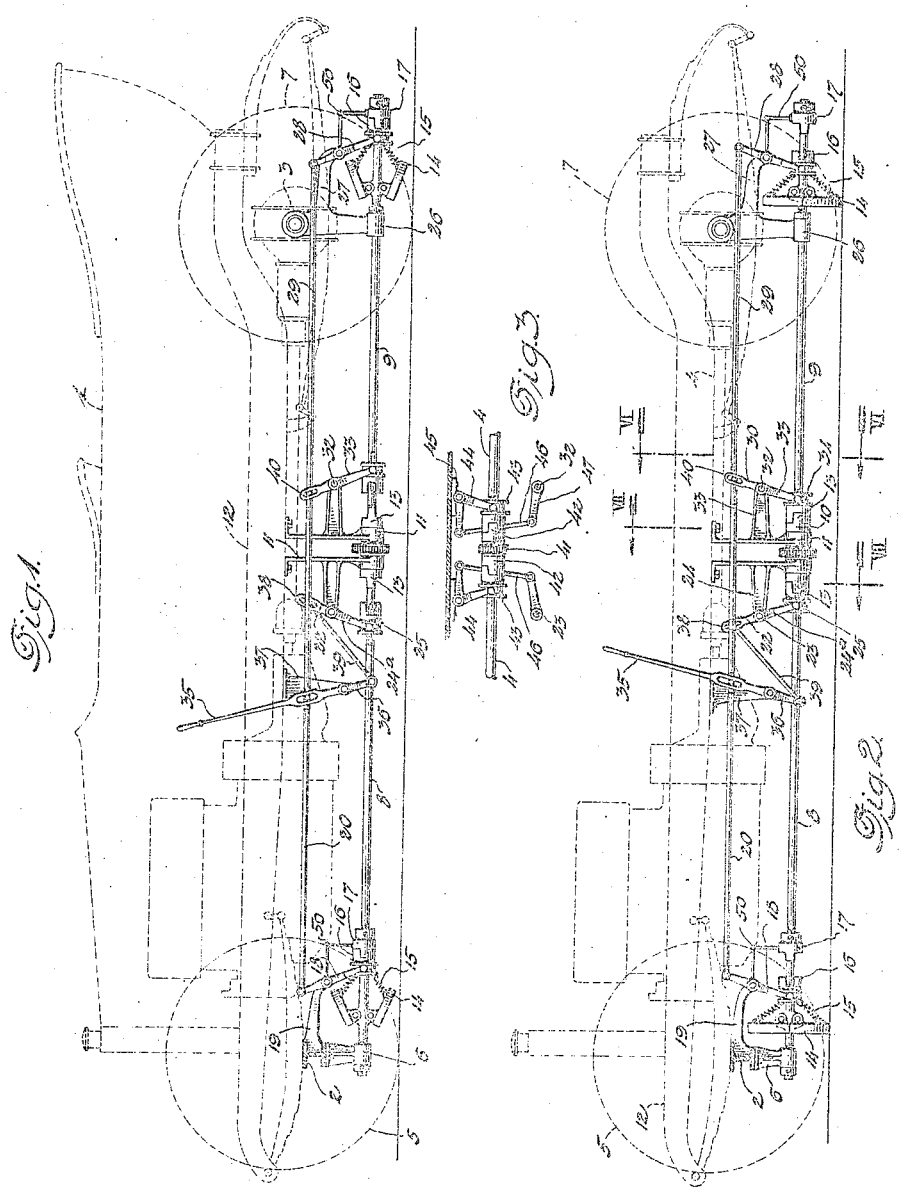

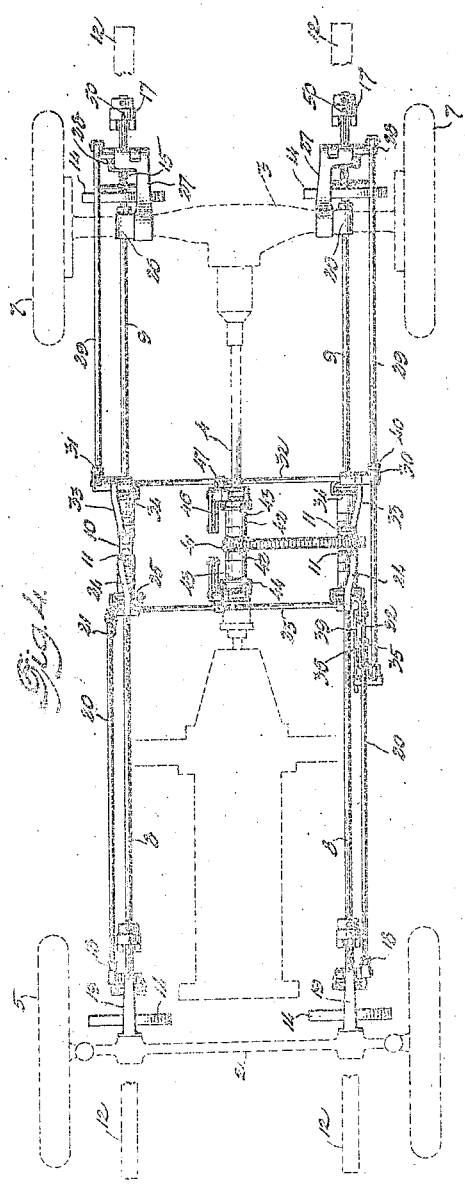

1,526,070

UNITED STATES PATENT OFFICE.

JOHN JOKISCH, OF DETROIT, MICHIGAN.

COMBINED JACK AND SHIFTING TRUCK FOR VEHICLES.

Application filed April 3, 1924. Serial No. 703,861.

*To all whom it may concern:*

Be it known that I, JOHN JOKISCH, a citizen of the United States, residing at Detroit, in the county of Wayne and State of Michigan, have invented certain new and useful Improvements in Combined Jacks and Shifting Trucks for Vehicles, of which the following is a specification, reference being had therein to the accompanying drawings.

This invention relates to a combined jack and shifting truck for vehicles, particularly automobiles.

The primary object of my invention is to furnish the chassis of an automobile with a four-wheel jack that will permit of the automobile being bodily raised to remove its wheels from the ground.

Another object of this invention is to furnish an automobile chassis with an auxiliary running gear by which an automobile may be moved sidewise. Such a running gear will permit of the automobile being easily parked or placed in a space in which it could not be otherwise conveniently placed.

A further object of this invention is to furnish an automobile with auxiliary front and rear trucks which may be driven in synchronism from the power plant of the automobile or the trucks individually operated for swinging either end of the automobile in a desired direction.

A further object of this invention is to provide an automobile with an auxiliary foldable wheel which when unfolded and turned is adapted to raise a portion of the automobile and permit of such portion being moved.

The above are a few of the objects attained by my invention and others will hereinafter appear as the construction is described by aid of the drawings, wherein—

Figure 1 is a side elevation of the combined jack and shifting truck as applied to an automobile which is shown by dotted lines;

Fig. 2 is a similar view showing the jack adjusted to raise the ground engaging wheels of the automobile off of the ground;

Fig. 3 is a detail view showing part of the power transmission mechanism as applied to a driven shaft of the automobile;

Fig. 4 is a plan of the jack and shifting truck in the position shown in Fig. 2;

Fig. 5 is an end view of one of the jacks;

Fig. 6 is a cross sectional view taken on the line VI—VI of Fig. 2, showing one side of the shifting truck, and Fig. 7 is a cross sectional view taken on the line VII—VII of Fig. 2, showing both sides of the truck.

In the drawings, the reference numeral 1 denotes a conventional form of automobile having a front axle 2, a rear axle housing 3, and an engine driven shaft 4.

Depending from the front axle 2, adjacent the front steering wheels 5 are hangers 6 and depending from the rear axle housing 3, adjacent the rear wheels 7 are hangers 26, said hangers longitudinally alining with the hangers 6 so that the outer ends of longitudinally alining shafts 8 and 9 may be journaled in said hangers. The confronting ends of said longitudinally alining shafts are loosely mounted in sleeves 10 journaled in hangers 11 depending from the chassis frames 12 of the automobile and the ends of the sleeves 10 terminate in clutch members 13.

Hingedly connected to the outer ends of the shafts 8 and 9, adjacent the hangers 6 and 26 are semi-circular wheel members 14 adapted to cooperate in forming a wheel about each shaft and said wheel members are connected by springs 15 to a slidable locking member 16 adapted to engage a locking member 17 loose on each shaft. The locking members 16 and 17 are in engagement with each other when the wheel members 14 are folded, as shown in Fig. 1, and when the locking member 16 is shifted away from the locking member 17, the wheel members 14 are swung or unfolded into a common plane at a right angle to the axis of the shaft to which said wheel members are hinged.

The slidable locking members 16 are adapted to be shifted by cranks 18 supported by brackets 19 from the front axle 2 and the cranks 18 have rearwardly extending rods 20 connected to cranks 21 and 22 on a transverse rock shaft 23 journaled in brackets 24 forming part of the hangers 11.

The rock shaft 23 has other cranks 24ª for shifting clutch members 25 slidably keyed on the shafts 8. When the clutch members 25 are shifted into engagement with the clutch members 13 of the sleeves 10 the shafts 8, just referred to, are adapted to be driven, as will hereinafter appear.

The hangers 26 are provided with brackets 27 and pivotally connected to said brackets are cranks 28 adapted for shifting the locking members 16 on the outer ends of the shafts 9, and the cranks 28 are connected by rods 29 to cranks 30 and 31 on a rock shaft 32 journaled in brackets 33, carried by the hangers 11; there being a pin and slot connection 40 between the crank 30 and the rod 29 connected thereto. The rock shaft 32 has other cranks 33 adapted for shifting a slidable clutch member 34 keyed on the shafts 9 and adapted for engagement with the clutch members 13 of the sleeves 10, so that the shafts 9 may be driven similar to the shaft 8.

For rocking the shafts 23 and 32, levers 35 and 36 are employed, said levers being pivotally mounted on a hanger 37 depending from the chassis frame 12 at the left hand side of the automobile. The rod 29, at the left hand side of the machine, has a pin and slot connection with the lever 35 so that oscillation of the lever 35 will shift the rod 29 and rock the shaft 32 though the medium of the crank 30.

The crank 22 of the rock shaft 23 has a pin and slot connection 38 with a link 39 pivotally connected to the lower end of the lever 36, whereby oscillation of the lever 36 shifts the rod 29 and rocks the shaft 23.

On the driven shaft 4 of the automobile is a loose sprocket wheel 41 having its hub portion provided with clutch members 42 adapted to be engaged by slidable clutch members 43 each keyed on the driven shaft 4. The slidable clutch members 43 are adapted to be shifted by bell cranks 44 pivotally supported from a transverse member 45 connecting the chassis frames 12. The bell cranks 44 are connected by links 46 to cranks 47 on the rock shafts 23 and 32.

The locking members 17 are prevented from turning by rigid connections 50 with the brackets 19 and 27, and with the locking members 16 and 17 interlocked, the wheel members 14 will be properly held for unfolding to engage the ground.

By shifting the lever 36 the wheel members 14 at the forward end of the automobile may be swung from an inactive folded position to substantially an active unfolded position. When a locking member 16 is shifted to place a wheel member in active position, the springs 15 become expansive and push the lower half of the wheel member against the ground to remain at an angle thereto, with the spring of said wheel member under tension. The upper half of the wheel member, being unobstructed by any ground, will assume a vertical active position. Now, by obtaining power from the shaft 4 the shaft 8 will be driven and the upper halves of the wheel members will be turned into engagement with the ground and raise the steering wheels 5 from the ground. As the lower halves of the wheel members leave the ground the expansive force of the springs causes the lower halves of the wheel members to assume vertical positions, in alinement with the other halves of the wheel members, thus completing said wheel members for movement of the automobile. The automobile may in this manner be placed on four auxiliary wheels, constituting two trucks, by which the automobile may be bodily shifted sidewise. With only one truck in an active position the opposite end of the automobile may serve as a pivot while the trucked end of the automobile is swung in an arc.

With both trucks in an active position the shaft 4 may be driven and by reason of the clutch members 43 having been shifted into engagement with the clutch members 42 simultaneously with the placing of the trucks in active positions, said trucks may be driven to move the automobile sidewise by power. It is obvious that when the shaft 4 is not driven by power and the trucks are in active positions that the automobile may be manually pushed sidewise, just as though it were on a wheeled platform.

When the locking members 16 are retracted incident to folding the wheel members, the springs 15 are pulled upon to the extent that said springs become retractile and as soon as the wheel member is released from the ground the wheel member is folded.

What I claim is:—

1. The combination with a motor driven vehicle having a driven shaft, of sets of shafts supported under said vehicle with one shaft of each set adapted to be driven from said driven shaft, wheel members hingedly connected to said sets of shafts adapted to be folded relative to said shafts and unfolded to raise the vehicle off of the ground, controlling means for the driven shaft of each set, and means adapted for folding and unfolding said wheel members.

2. The combination with a vehicle, of sets of shafts under said vehicle and supported thereby, foldable wheel members on said shafts adapted to be unfolded to raise said vehicle off of the ground, and controlling means for the adjustable wheel members of each set of shafts.

3. The combination of a vehicle having front and rear axle assemblies, foldable wheel members adjacent each axle assembly and adapted to be unfolded to raise the vehicle off of the ground and provided auxiliary wheels by which the vehicle may be shifted, and means at one side of said vehicle for adjusting all of said wheel members.

4. The combination called for in claim 3, wherein said means includes levers, cranks and rods.

5. The combination of a vehicle, longitudinal shafts supported under said vehicle, wheel members supported by said shafts and adapted for raising the vehicle off of the ground, said wheel members being hingedly connected to said shafts and normally folded, means for unfolding said wheel members relative to said shafts, and locking means adapted to hold said wheel members folded.

6. The combination of a vehicle, a folded two-part wheel adjacent each wheel of the vehicle, and means adapted for unfolding each two-part wheel to raise the vehicle off of the ground and permit of the vehicle being moved by the two-part wheels.

7. The combination called for in claim 6, and means operatable from said vehicle adapted for driving some of the two-part wheels.

In testimony whereof I affix my signature in presence of two witnesses.

JOHN JOKISCH.

Witnesses:
KARL H. BUTLER,
ANNA M. DORR.